United States Patent [19]
Raque

[11] Patent Number: 5,199,612
[45] Date of Patent: Apr. 6, 1993

[54] TRAVELING BUCKET WITH DISPENSING OUTLET CLOSURE MECHANISM

[75] Inventor: Glen F. Raque, Louisville, Ky.

[73] Assignee: Raque Food Systems, Inc., Louisville, Ky.

[21] Appl. No.: 704,773

[22] Filed: May 23, 1991

[51] Int. Cl.⁵ .................................................. B67D 3/00
[52] U.S. Cl. .................................... 222/134; 222/185;
222/504; 222/545; 222/547; 222/556; 105/280
[58] Field of Search ............... 222/134, 181, 476, 545,
222/556, 558, 504, 185, 547, 564; 105/280, 286

[56] References Cited

U.S. PATENT DOCUMENTS

| | | | |
|---|---|---|---|
| 2,749,940 | 6/1956 | Bronson | 222/545 |
| 3,052,384 | 9/1962 | Clark | 222/504 |
| 3,596,609 | 8/1971 | Ortner et al. | 105/280 X |
| 3,838,649 | 10/1974 | Barnard | 105/280 X |
| 3,907,178 | 9/1975 | Armstrong | 222/504 |
| 3,997,089 | 12/1976 | Clarke et al. | 222/545 |
| 4,010,695 | 3/1977 | Mantione | 222/545 X |
| 4,235,169 | 11/1980 | Peterson | 105/286 X |
| 4,372,730 | 2/1983 | Ladt | 222/504 X |
| 4,545,446 | 10/1985 | Kokabu | 222/556 X |
| 4,957,221 | 9/1990 | Murray | 222/558 X |

Primary Examiner—Andres Kashnikow
Assistant Examiner—A. Pomrening
Attorney, Agent, or Firm—Barnes & Thornburg

[57] ABSTRACT

A traveling bucket assembly is operable to dispense particulate product contained in a pair of food hoppers simultaneously onto target areas on an underlying conveyor. An outside gate is movable to open and close a dispensing outlet formed in the bottom of each of the food hoppers. An inside gate in the hoppers is movable independently of the outside gate to block further discharge of product from the hoppers even though the outside gate is retained in its opened position so that discharge of product can be regulated with greater precision.

41 Claims, 5 Drawing Sheets

TRAVELING BUCKET WITH DISPENSING OUTLET CLOSURE MECHANISM

BACKGROUND AND SUMMARY OF THE INVENTION

This invention relates to product-dispensing buckets, and, in particular, to buckets which travel along a path and are operable to dispense products onto an underlying target. More particularly, this invention relates to a closure mechanism for controlling discharge of particulate food product through a dispensing outlet formed in a product-dispensing bucket onto an underlying food item such as a pizza transported on a conveyor or into an underlying container transported on a conveyor.

Topping units are used in the food preparation industry to top a series of food items such as pizzas, casseroles, fresh or freezable food products, or the like with measured quantities of food product such as beef crumbles, rice, vegetable pieces, or the like. In many applications, a series of food items to be topped with one or more food products are moved on a conveyor line through such a topping unit.

One shortcoming of many conventional topping units is an inability to restrict or regulate the flow of dispensed product properly during operation of the topping unit. It is important to ensure that the dispensed product is confined to a predefined target area on each and every food item to be topped moving through the topping unit. Further, it is desirable to dispense only a measured quantity of product onto a target area. Product overspill and overflow contribute to unwanted waste of food product during operation of a topping unit.

According to the present invention, a bucket assembly is provided for dispensing product onto an underlying carrier. The bucket assembly includes a hopper formed to include a dispensing outlet. First means is provided for selectively opening and closing the dispensing outlet. Second means is also provided for selectively closing the dispensing outlet independently of the first means. A product-receiving receptacle is established in the hopper upon use of the second means to close the dispensing outlet and block discharge of product from the hopper through the dispensing outlet even though the first means is not actuated to close the dispensing outlet.

In preferred embodiments, the first means includes an external closure flap pivotably connected to the hopper and means for moving the external closure flap relative to the hopper to open and close the dispensing outlet. The second means includes an internal closure flap positioned inside the hopper to pivot relative to the hopper and means for moving the internal closure flap inside the hopper to open and close the dispensing outlet.

In use, the external and internal closure flaps are moved to open the dispensing outlet and allow product such as beef crumbles, rice, or vegetable pieces in the hopper to fall under gravity onto an underlying carrier such as a pizza or other food item to be topped conveyed through a topping unit. Discharge of product from the hopper through the dispensing outlet can be regulated, restricted, or otherwise governed by controlled movement of the pivotable internal closure flap inside the hopper prior to movement of the pivotable external closure flap to a position closing the dispensing opening. Advantageously, proper automatic or manual manipulation of the internal closure flap allows an operator to confine application of product dispensed from the hopper to a predefined target area on an underlying food item or in an underlying container, thereby minimizing product overspill. Also, provision of the internal closure flap makes it possible for an operator to control the quantity of product dispensed from the hopper with great precision.

The improved bucket assembly is usable to dispense many types of small wet or dry particulates and is well suited for use in dispensing products other than food products. For example, it may be used to regulate flow of product as it is being dispensed to deposit and layer such product neatly either in a container or on top of an underlying carrier with great accuracy in applications requiring tight restrictions on placement of dispensed products.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE INVENTION

Figure 1:
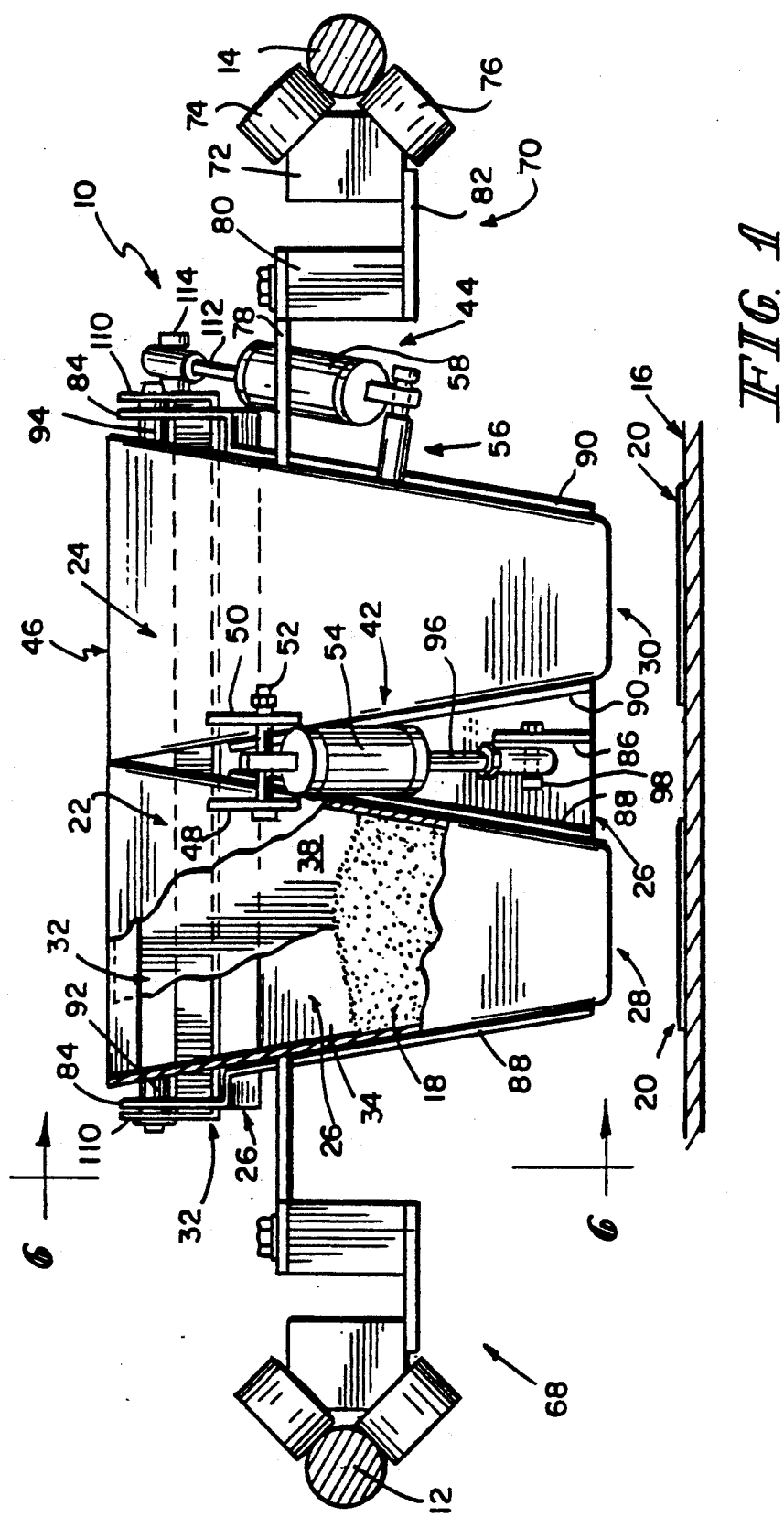
FIG. 1 is a side elevation view of a bucket assembly in accordance with the present invention over a conveyor system, with portions of the left side hopper broken away to show a particulate product inside the hopper and internal and external closure flaps for regulating discharge of product through a dispensing outlet formed in the bottom of the hopper.

A bucket assembly 10 is movable on first and second guide rails 12, 14 above a conveyor 16 and operable to dispense product 18 carried in the bucket assembly 10 onto items 20 such as pizza-pies transported by the conveyor 16 as shown in FIG. 1. In the illustrated embodiment, bucket assembly 10 includes a pair of hoppers 22, 24 filled with a food product 18 such as beef crumbles, vegetable pieces, or other food pieces. The hoppers 22, 24 can be emptied to deposit food product 18 onto underlying items 20 as shown in the sequence depicted in FIGS. 6-8. Of course, bucket assemblies 10 are also well suited for dispensing food and non-food particulates into underlying containers or onto other types of underlying product carriers.

The bucket assembly 10 also includes an outside gate 26 that is movable by remote control to open and close simultaneously a dispensing outlet 28 formed in the bottom of left hopper 22 and a dispensing outlet 30 formed in the bottom of right hopper 24. An inside gate 32 is movable by remote control independently of the outside gate 26 to open and close simultaneously the dispensing outlets 28, 30 formed in the left and right hoppers 22, 24 even when the outside gate 30 is retained in a dispensing outlet-opening position as shown best in FIGS. 7 and 8.

Figure 2:
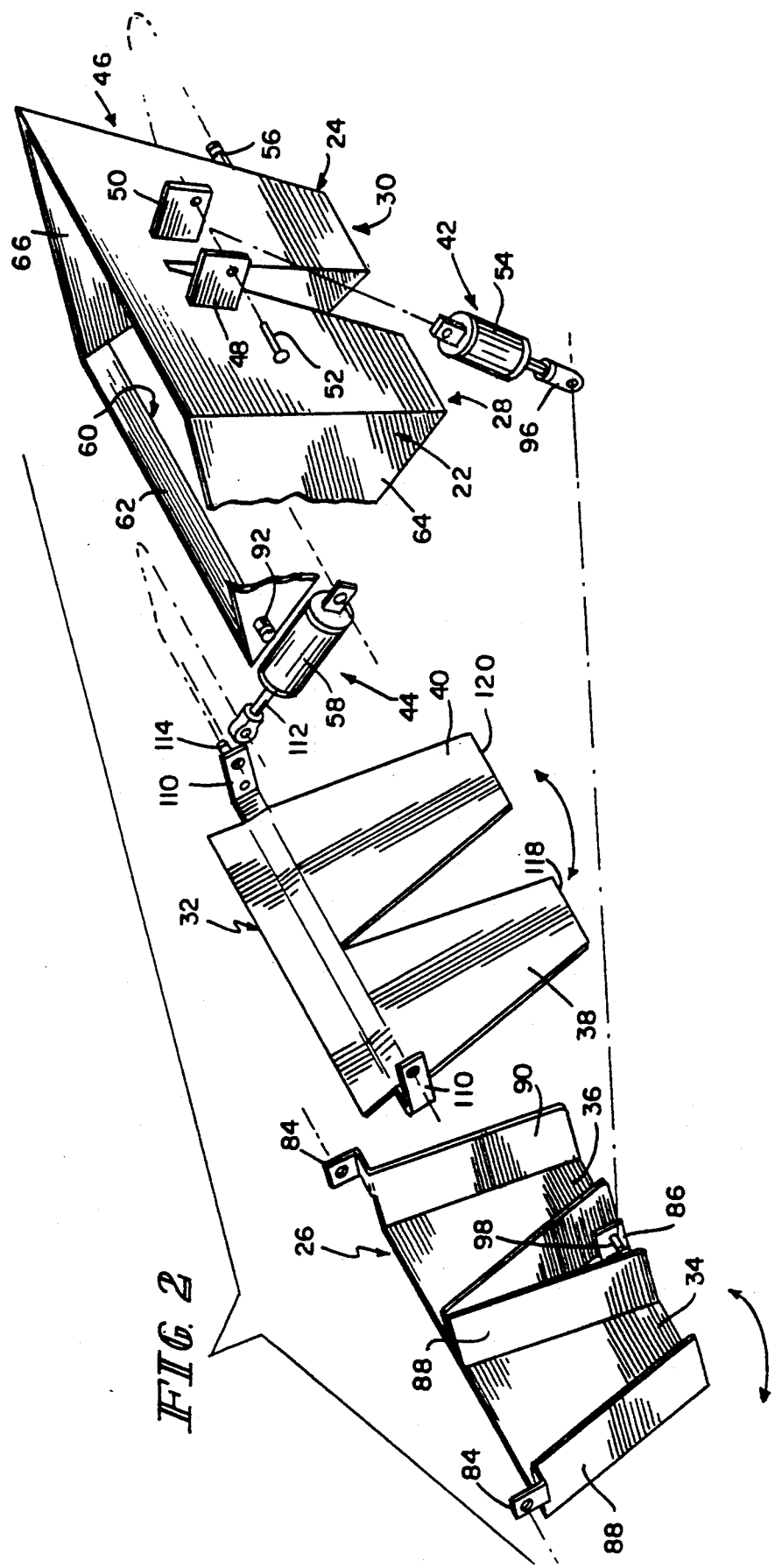
FIG. 2 is an exploded assembly view of the bucket assembly of FIG. 1 showing, in sequence from right to left, a bucket having left and right hoppers, an inside gate including left and right internal closure flaps, and an outside gate including left and right external closure flaps.

Referring to FIG. 2, outside gate 26 includes a left closure flap 34 for closing the dispensing outlet 28 in left hopper 22 and a right closure flap 36 for closing the dispensing outlet 30 in right hopper 24. Inside gate 32 includes a left closure flap 38 for closing the dispensing outlet 28 in left hopper 22 and a right closure flap 40 for closing the dispensing outlet 30 in right hopper 24. Each of the outside and inside gates 26, 32 is mounted to pivot relative to hoppers 22, 24 under the control of moving means 42, 44 in the manner described below to open and close the dispensing outlets 28, 30 in hoppers 22, 24.

Referring again to FIGS. 1 and 2, a bucket 46 is provided and formed to include the left and right hoppers 22, 24. A pair of cylinder mounting brackets 48, 50 are appended to the front side of bucket 46 and a shoulder bolt 52 is coupled to brackets 48, 50 to support one end of cylinder 54 for pivotable movement relative to bucket 46. A pivot post 56 is appended to the right side of right hopper 24 to support one end of cylinder 58 for pivotable movement relative to bucket 46.

The back side of bucket 46 is formed to include a large opening 60 extending across the width of each of left and right hoppers 22, 24 as shown best in FIG. 2. Only a rigid strap 62 is provided to interconnect the left outside side wall 64 of the left hopper 22 to the right outside side wall 66 of the right hopper 24. Outside gate 26 is movable relative to bucket 46 to open and close the large opening 60 formed in the back side of bucket 46 as shown best in FIGS. 6-8 to regulate discharge of product 18 from hoppers 22 and 24. Inside gate 32 is also movable independently of outside gate 26 to regulate discharge of product 18 from hoppers 22 and 24 when the outside gate 26 is retained in its opened position as shown in FIGS. 7 and 8.

Bucket 46 is supported for movement above the conveyor 16 by left and right bucket support assemblies 68, 70 as shown, for example, in FIG. 1. It will be understood that it is within the scope of the present invention to support bucket 46 for movement using a variety of techniques. Right bucket support assembly 70 is shown best in FIGS. 1 and 3 and includes an elongated cam follower block 72, a pair of spaced top wheels 74 rotatably mounted to cam follower block 72 and oriented to ride on an upper portion of second guide rail 14, and a pair of spaced bottom wheels 76 rotatably mounted to cam follower block 72 and oriented to ride on a lower portion of second guide rail 14. Right bucket support assembly 70 further includes a bucket support plate 78 appended to the right outside side wall 66 of right hopper 24, a vibrator damper assembly 80 depending from a distal end of bucket support plate 78, and a connector plate 82 for connecting the vibrator damper assembly 80 to the cam follower block 72. As shown in FIG. 1, the components comprising left bucket support assembly 68 are similar in number and function to the components comprising the right bucket support assembly 70.

Outside gate 26 is pivotably mounted to bucket 46 so that outside gate 26 is able to swing back and forth under the control of the hydraulic cylinder assembly 42 to open and close the large opening 60, formed in the back side of bucket 46, thereby regulating flow of product through dispensing outlets 28 and 30. Outside gate 26 includes a pivot-mounting bracket 84 on each end of a top edge of gate 26 and a piston-mounting bracket 86 in the center of a bottom edge of gate 26 as shown best in FIG. 2. Outside gate 26 also includes a first pair of side panels 88 bordering left closure flap 34 and a second pair of side panels 90 bordering right closure flap 36.

Figure 3:
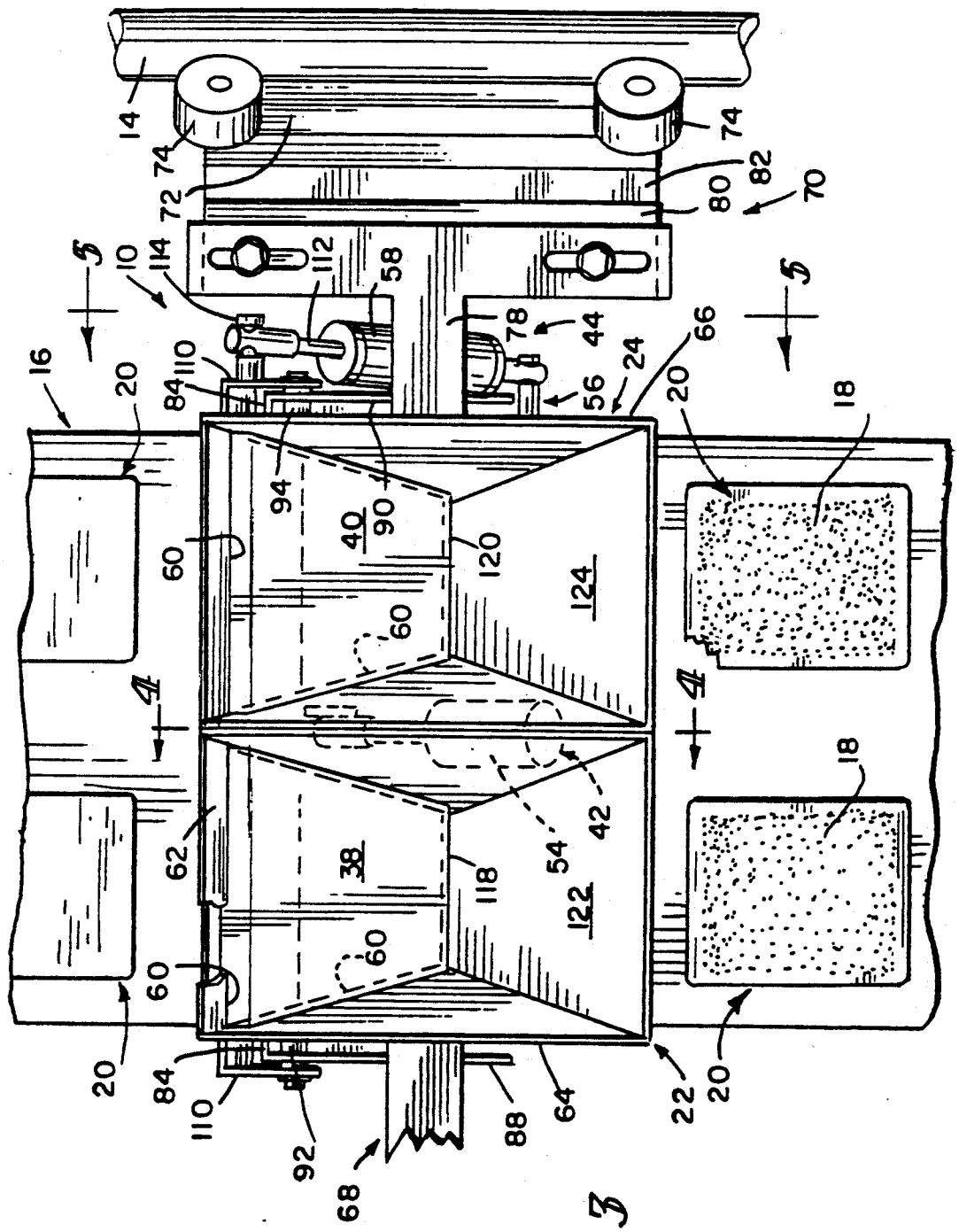
FIG. 3 is a top plan view of the bucket assembly of FIG. 1 showing the internal closure flaps in dispensing outlet-closing positions in each of the empty left and right hoppers and the position of left and right hoppers relative to the underlying conveyor.
Figure 4:
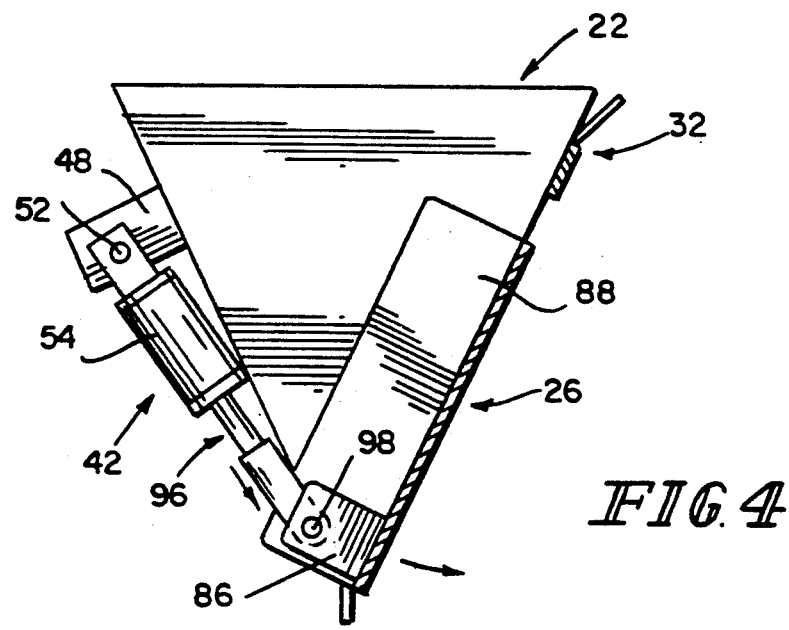
FIG. 4 is a sectional view of the bucket assembly taken along line 4—4 of FIG. 3 looking toward the left hopper and showing the cylinder assembly situated between the left and right hoppers and configured to move both external closure flaps between dispensing outlet-opening and outlet-closing positions.
Figure 5:
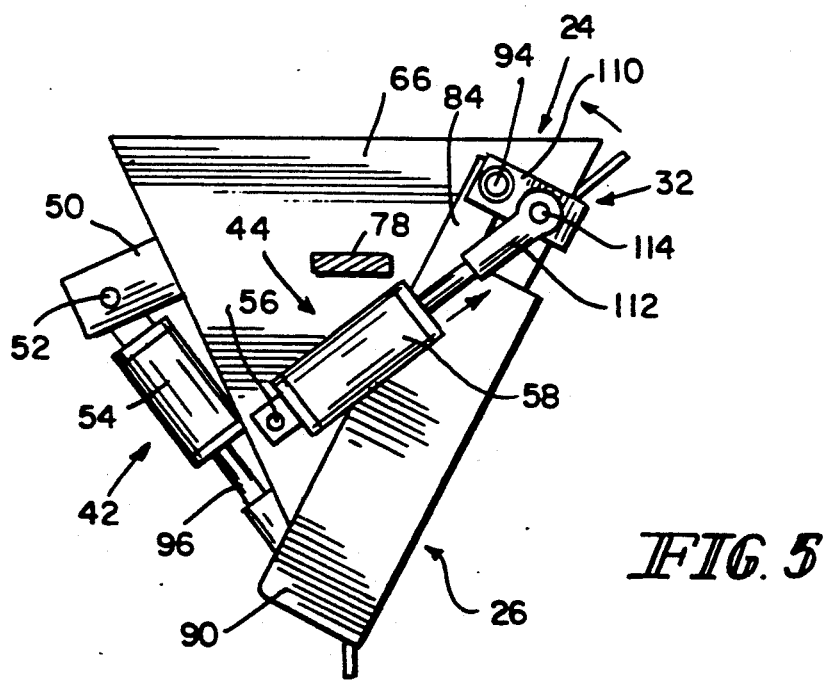
FIG. 5 is a sectional view of the bucket assembly taken along lines 5—5 of FIG. 3 looking toward the right hopper and showing another cylinder assembly situated next to the right hopper and configured to move both internal closure flaps between dispensing outlet-opening and outlet-closing positions.

The mounting brackets 84 on outside gate 26 are connected to left and right shoulder bolts 92, 94. These shoulder bolts 92, 94 are appended to left and right hoppers 22, 24, respectively, as shown in FIGS. 1 and 3 to permit outside gate 26 to swing on the shoulder bolts 92, 94. Cylinder assembly 42 includes a piston 96 having one end pivotably coupled to a shoulder bolt 98 fixed to piston-mounting bracket 86 and another end inserted into the cylinder 54 which is pivotably coupled to the pivot post 52 extending between the cylinder mounting brackets 48, 50 fixed to the left and right hoppers 22, 24. Conventional means (not shown) is provided for actuating the hydraulic cylinder assembly 42 to cause the piston 96 to move within cylinder 54 so that the outside gate 26 pivots about shoulder bolts 92, 94 and moves relative to bucket 46 between its dispensing outlet-closing position shown in FIGS. 1 and 3-6 and its dispensing outlet-opening position shown in FIGS. 7 and 8. It will be understood that various linkages and hydraulic, electrical, mechanical, pneumatic, or other means will provide suitable means for moving outside gate 26 relative to bucket 46 to open and close the dispensing outlets 28, 30 formed in left and right hoppers 22, 24 simultaneously by remote control.

Inside gate 32 is positioned so that it lies inside the interior region of bucket 46 defined by closing the outside gate 26. Inside gate 32 is also pivotably mounted to bucket 46 so that it is able to swing back and forth a small distance inside that interior region defined inside bucket 46. Inside gate 32 swings as described under the control of the hydraulic cylinder assembly 44 to regulate the downward gravity flow of product 18 in the left and right hoppers 22, 24 toward the underlying dispensing outlets 28, 30 formed therein.

Inside gate 32 includes a pivot-mounting bracket 110 on each end of a top edge of gate 32. Each bracket 110 is formed to include an aperture so that it can be mounted on one of the left and right shoulder bolts 92, 94 fixed to the left and right hoppers 22, 24 to cause the inside gate 32 to be mounted on the shoulder bolts 92, 94 for pivotable movement relative to bucket 46. As shown best in FIG. 1, the pivot-mounting brackets 110 on the inside gate 32 are situated in spaced-apart relation to straddle both the bucket 46 and the pivot-mounting brackets 84 appended to the outside gate 26.

Cylinder assembly 44 includes the cylinder 58 and a piston 112. Piston 112 has one end pivotably coupled to a pivot post 114 fixed to pivot-mounting bracket 110 as shown best in FIG. 5 and another end inserted into the cylinder 58 which is pivotably coupled to the pivot post 56 appended to the outside wall of right hopper 24.

Figure 6:
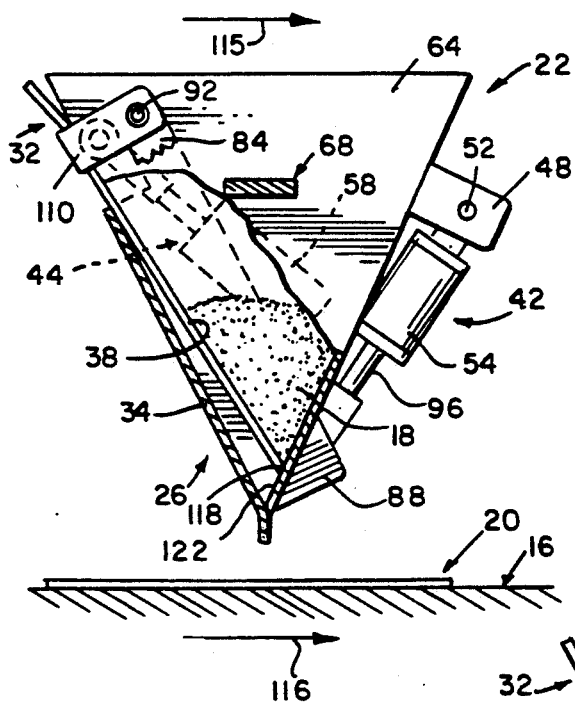
FIG. 6 is a sectional view of the bucket assembly taken along lines 6—6 of FIG. 1 showing the left hopper loaded with product and the internal and external closure flaps engaging the hopper to close the dispensing outlet formed in the left hopper.
Figure 7:
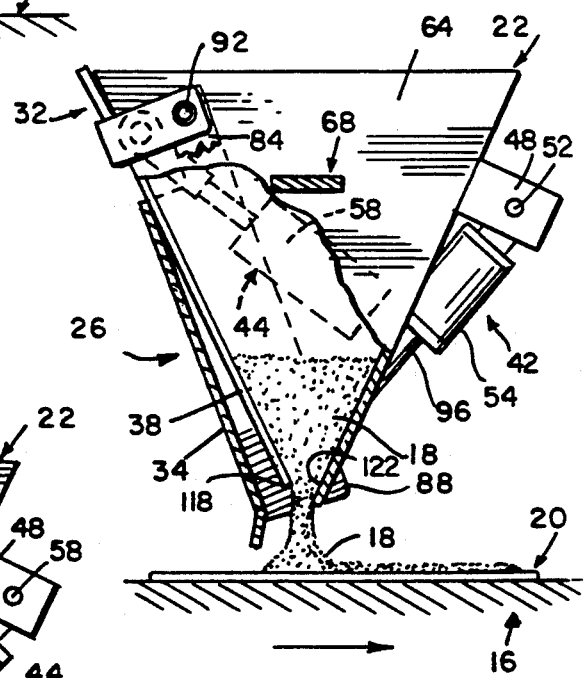
FIG. 7 is a view similar to FIG. 6 showing pivoted movement of both of the external and internal closure flaps relative to the hopper to open the dispensing outlet and discharge product onto an underlying carrier on a moving conveyor.
Figure 8:
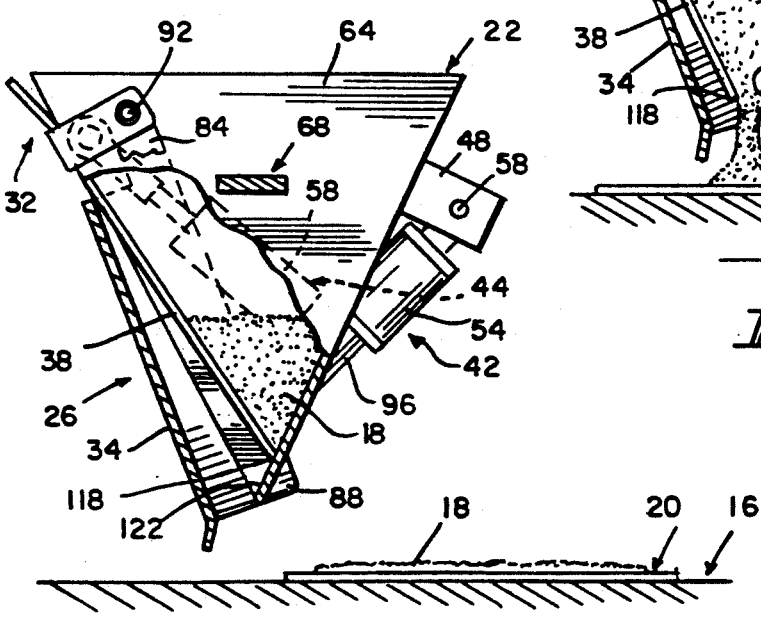
FIG. 8 is a view similar to FIGS. 6 and 7 showing return of the internal closure flap to a position engaging the hopper to establish a product-receiving receptacle in the hopper and block discharge of product through the underlying dispensing outlet while the external closure flap is retained in a dispensing outlet-opening position.

Conventional means (not shown) is provided for actuating the hydraulic cylinder assembly 44 to cause piston 112 to move within cylinder 58 so that the inside gate 32 pivots about shoulder bolts 92, 94 and moves relative to bucket 46 between its product-retaining position shown in FIG. 6 and its product-dispensing position shown in FIG. 7. It will be understood that various linkages and hydraulic, electrical, mechanical, pneumatic, or other means will provide suitable means for moving inside gate 32 relative to bucket 46 to retain and release product 18 deposited into left and right hoppers 22, 24 simultaneously by remote control.

Operation of bucket assembly 10 to deposit food crumbles 18 onto a pair of side-by-side pizza dough rectangles 20 transported on a conveyor 16 moving in direction 116 is illustrated in sequence in FIGS. 6-8. Initially, the cylinder assemblies 42, 44 are actuated to move the outside and inside gates 26, 32 to assume closed positions as shown in FIG. 6. Inside gate 32 includes a lower edge 118 on left closure flap 38 and a lower edge 120 on right closure flap 40 that engage inner walls 122, 124 in the left and right hoppers 22, 24 when the inside gate 32 is moved to the product-retaining position shown in FIG. 6. Accordingly, the left closure flap 38 cooperates with the inside walls of the left hopper 22 to establish a first receptacle (shown best in FIG. 3) for retaining the food crumbles 18 in the left hopper 22. Next door, the right closure flap 40 cooperates with the inside walls of the right hopper 24 to establish an adjacent second receptacle (shown best in FIG. 3) for retaining more food crumbles 18 in the right hopper 24. Meanwhile, the left and right closure flaps 34, 36 and the pairs of side panels 88, 90 of the outside gate 26 are positioned relative to bucket 46 to close the dispensing outlets 28, 30 formed in the bottom portions of each of the left and right hoppers 22, 24.

Once the pizza dough rectangles 20 transported by conveyor 16 are positioned properly underneath bucket 46, the cylinder means 42, 44 are actuated by remote control automatically or manually to move the outside and inside gates 26, 32 to their opened positions. Movement of the inside gate 32 to the product-releasing position shown in FIG. 7 permits food crumbles 18 reserved in the first and second receptacles established in the left and right hoppers 22, 24 to fall simultaneously under gravity out of those receptacles toward the underlying dispensing outlets 28, 30. Such food crumbles 18 continue to fall downwardly under gravity onto the underlying pizza dough rectangles 20 because the outside gate 26 is retained in its Product-dispensing position. During such dispensing, the food crumbles 18 will be deposited onto the pizza dough rectangles 20 in relatively even layers because of the planned relative movement of the traveling bucket 46 in direction 115 and moving conveyor 16 in direction 116.

The inside gate 32 can be moved to a closed position before movement of the outside gate 26 to its closed position as shown in FIG. 8. This enables better control of the amount of product 18 that is dispensed from the twin hoppers 22, 24. In effect, the inside gate 32 cuts the escaping flow of product 18 inside the hoppers 22, 24 before the outside gate 26 closes. This type of gate operation is particularly useful in applications where it is desirable to restrict the flow of product 18 out of a dispensing bucket when there are tight restrictions on the placement of the product 18 onto an underlying area such as a moving pizza dough rectangle 20 or other product carrier. This design is especially useful for dispensing small particulates such as wet or dry rice, vegetable pieces, and meat crumbles onto or into rectangular target areas. Early closure of the inside gate 32 functions to slow discharge of product 18 preparatory to shutting of discharge all together and also prevents the discharged product 18 from being sprayed onto places than the targeted deposition area(s).

Although the present invention has been described in detail with reference to certain preferred embodiments, variations and modifications exist within the scope and spirit of the invention as described and defined in the following claims.

I claim:

1. A bucket assembly for dispensing content onto an underlying carrier, the bucket assembly comprising
a hopper formed to include a dispensing outlet,
first means including an external closure flap for selectively rotating about an axis between a fully opened position and a fully closed position for opening and closing the dispensing outlet to regulate discharge of any contents in the hopper through the dispensing outlet, and
second means for selectively closing the dispensing outlet independently of the first means to block discharge of any contents in the hopper through the dispensing outlet so that a contents-receiving receptacle is established in the hopper to retain the contents in the hopper without actuation of the first means to close the dispensing outlet,
the second means pivoting about substantially the same axis as the first means for closing the dispensing outlet.

2. The bucket assembly of claim 1, wherein the first means further includes first moving means for moving the external closure flap relative to said hopper to said opened position so that the contents can fall under gravity out of the hopper through the dispensing outlet when the dispensing outlet is opened by the second means.

3. The bucket assembly of claim 2, wherein the second means includes an internal closure flap in the hopper and second moving means for moving the internal closure flap to a position in the hopper closing the dispensing outlet while the external flap is retained by the first moving means in said opened position so that the internal closure flap and the hopper cooperate to define the contents-receiving receptacle in the hopper.

4. The bucket assembly of claim 1, wherein the second means includes an internal closure flap movable in the hopper between a first position engaging an inner wall of the hopper to establish the contents-receiving receptacle therein and a second position disengaging the inner wall of the hopper to discharge contents from the contents-receiving receptacle and the hopper, and wherein movement of the internal flap to its second position permits contents in the contents-receiving receptacle in the hopper to fall under gravity through the dispensing outlet when the external flap is retained in its opened position.

5. The bucket assembly of claim 4, wherein the second means further includes means for returning the internal closure flap to its first position engaging the inner wall of the hopper while the external flap is retained in its opened position to reestablish the contents-receiving receptacle in the hopper and block the flow of contents in the hopper through the dispensing outlet.

6. The bucket assembly of claim 1, wherein the second means includes an internal closure flap situated inside the hopper and movable between a closed position blocking discharge of contents in the hopper through the dispensing outlet and an opened position permitting discharge of contents in the hopper through the dispensing outlet when the external closure flap is retained in its opened position.

7. The bucket assembly of claim 6, wherein the second means further includes means for moving the internal closure flap to its closed position while the external closure flap is retained in its opened position to block contents in the hopper from being discharged through the dispensing outlet.

8. The bucket assembly of claim 6, wherein the second means further includes means for pivotably coupling the internal closure flap to the hopper so that the internal closure flap is pivotable between sad closed and opened positions and the internal closure flap includes a distal edge situated to engage an inside wall of the hopper upon movement of the internal closure flap to its closed position and lie over the dispensing outlet to block discharge of any contents in the hopper through the dispensing outlet.

9. The bucket assembly of claim 6, wherein the first means further includes first moving means for moving the external closure flap relative to the hopper between said closed and opened positions and the second means further includes second moving means for moving the internal closure flap relative to the hopper between said closed and opened positions.

10. The bucket assembly of claim 6, wherein the first means further includes first moving means for moving the external closure flap to its opened position to open the dispensing outlet and the second means further includes second moving means for moving the internal closure flap to its opened position to permit contents contained in the hopper to fall under gravity through the opened dispensing outlet and for moving the internal closure flap to its closed position while the external closure flap occupies its opened position to block further discharge of contents from the hopper through the opened dispensing outlet.

11. A bucket assembly for dispensing contents onto an underlying carrier, the bucket assembly comprising
a hopper formed to include a dispensing outlet,
first means for selectively rotating about an axis between a fully open position and a fully closed position for opening and closing the dispensing outlet to regulate discharge of any contents in the hopper through the dispensing outlet, and
second means for selectively closing the dispensing outlet independently of the first means, the second means including an internal closure flap movable between a closed position blocking discharge of any contents in the hopper through the dispensing outlet and an opened position permitting discharge of contents in the hopper through the dispensing outlet as long as the dispensing outlet is not closed by the first means the second means pivoting about substantially the same axis as the first means for closing the dispensing outlet.

12. The bucket assembly of claim 11, wherein the internal closure flap is situated inside the hopper.

13. The bucket assembly of claim 12, wherein the second means further includes means for pivotably coupling the internal closure flap to the hopper so that the internal closure flap is pivotable.

14. The bucket assembly of claim 13, wherein the internal closure flap includes a distal edge situated to engage the hopper upon movement of the internal closure flap to its closed position and cover the dispensing outlet to block discharge of any contents in the hopper through the dispensing outlet.

15. The bucket assembly of claim 11, wherein the second means further includes means for moving the internal closure flap to its closed position to block discharge contents from the hopper through the dispensing outlet.

16. The bucket assembly of claim 15, wherein the moving means is situated outside of the hopper and is coupled to the internal closure flap and the hopper.

17. The bucket assembly of claim 15, wherein the moving means includes a piston pivotably connected to the internal closure flap and coupled to a cylinder pivotably connected to the hopper.

18. The bucket assembly of claim 11, wherein the first means includes an external closure flap movable between a closed position blocking discharge of contents in the hopper through the dispensing outlet and an opened position permitting discharge of contents in the hopper through the dispensing outlet.

19. The bucket assembly of claim 18, wherein the first means further includes means for moving the external closure flap between its opened and closed position independently of the internal closure flap so that the external closure flap is retainable in its opened position while the internal closure flap is moved to its closed position.

20. The bucket assembly of claim 19, wherein the moving means is situated outside of the hopper and is coupled to the external closure flap and the hopper.

21. The bucket assembly of claim 19, wherein the moving means includes a hydraulic cylinder assembly pivotably coupled at one end to the external closure flap and at another end to the hopper.

22. A bucket assembly for dispensing contents onto an underlying carrier, the bucket assembly comprising
a hopper formed to include a dispensing outlet,
an external closure flap,
means for mounting the external closure flap to the hopper for rotation about an axis between a fully closed position blocking discharge of any contents in the hopper through the dispensing outlet and a fully opened position permitting discharge of any contents in the hopper through the dispensing outlet,
an internal closure flap;

means for mounting the internal closure flap inside the hopper for movement between a closed position establishing a contents-receiving receptacle in the hopper above the dispensing outlet and an opened position discharging contents toward the dispensing outlet, the internal closure flap pivoting about substantially the same axis as the external closure flap, and means for independently moving each of the external and internal closure flaps between said opened and closed positions so that the internal closure flap can be moved to its closed position while the external closure flap is retained in its opened position to establish a contents-receiving receptacle in the hopper above the dispensing outlet and to block discharge of any contents from the hopper through the dispensing outlet.

23. The bucket assembly of claim 22, wherein the moving means includes a first cylinder assembly coupled to the external closure flap and a second cylinder assembly coupled to the internal closure flap.

24. The bucket assembly of claim 23, wherein the first cylinder assembly includes a piston pivotably connected to the external closure flap and coupled to a cylinder pivotably connected to the hopper.

25. The bucket assembly of claim 23, wherein the second cylinder assembly includes a piston pivotably connected to the internal closure flap and coupled to a cylinder pivotably connected to the hopper.

26. The bucket assembly of claim 22, wherein the mounting means includes a pair of mounting brackets on the external closure flap and means coupled to the hopper for pivotably engaging the pair of mounting brackets on the external closure flap so that the external closure flap is pivotable relative to the hopper between its opened and closed positions.

27. The bucket assembly of claim 26, wherein the moving means includes a hydraulic cylinder assembly pivotably coupled to each of the external closure flap and the hopper.

28. The bucket assembly of claim 22, wherein the mounting means includes a pair of mounting brackets on the internal closure flap and means coupled to the hopper for pivotably engaging the pair of mounting bracketed on the internal closure flap so that the internal closure flap is pivotable in the hopper between its opened and closed positions.

29. The bucket assembly of claim 28, wherein the moving means includes a hydraulic cylinder assembly pivotably coupled to each of the internal closure flap and the hopper.

30. The bucket assembly of claim 22, wherein the hopper includes an inside wall around the dispensing outlet, the internal closure flap includes a distal edge situated to engage the inside wall upon movement of the internal closure flap to its closed position to establish said contents-receiving receptacle above the dispensing outlet and the moving means includes first linkage means for moving the external closure flap to its opened position and second linkage means for moving the internal closure flap to its closed position while the external closure flap is retained in its opened position sot ht the distal edge of the internal flap engages the inside wall of the hopper to establish the contents-receiving receptacle in the hopper and block any further discharge of the contents from the hopper through the underlying dispensing outlet.

31. The bucket assembly of claim 30, wherein the first linkage means includes a hydraulic cylinder assembly pivotably coupled to each of the external closure flap and the hopper.

32. The bucket assembly of claim 30, wherein the second linkage means includes a hydraulic cylinder assembly pivotably coupled to each of the internal closure flap and the hopper.

33. A bucket assembly for dispensing contents onto an underlying carrier, the bucket assembly comprising
a bucket including a first hopper, a second hopper, and means for connecting the first and second hoppers to one another so that the hoppers are arranged in side-by-side relation, each hopper including a bottom end formed to include a dispensing outlet therein, first means for selectively rotating about an axis between a fully open position and a fully closed position for opening and closing the dispensing outlets of each of the first and second hoppers simultaneously to regulate discharge of any contents in each of the hoppers from the hoppers through the dispensing outlets onto underlying carriers, and second means for selectively closing the dispensing outlets of each of the first and second hoppers simultaneously without using the first means to close the dispensing outlets to prevent any contents in the hopper from being discharged even when said first means for selectively opening and closing the dispensing outlets is in an open position so as to provide a contents-receiving receptacle in each of the first and second hoppers above the dispensing outlets.

34. A bucket assembly for dispensing product onto an underlying carrier, the bucket assembly comprising
a bucket including a first hopper, a second hopper, and means for connecting the first and second hoppers to one another so that the hoppers are arranged in side-by-side relation, each hopper including a bottom end formed to include a dispensing outlet therein, first means for selectively opening and closing the dispensing outlets of each of the first and second hoppers simultaneously to regulate discharge of product in each of the hoppers from the hoppers thorough he dispensing outlets onto underlying carriers, and second means for selectively closing the dispensing outlets of each of the first and second hoppers simultaneously without using the first means to close the dispensing outlets so that a product-receiving receptacle is established in each of the first and second hoppers above the dispensing outlets, wherein the first means includes an outside gate including first and second external closure flaps and means for connecting the outside gate to the bucket so that each of the first and second external closure flaps is movable between a closed position engaging the hopper and closing the dispensing outlet to an opened position disengaging the hopper and opening the dispensing outlet.

35. The bucket assembly of claim 34, wherein the first means further includes means for moving the outside gate relative to the bucket to move the first and second external closure flaps in unison between their closed and opened positions.

36. The bucket assembly of claim 35, wherein the moving means includes a hydraulic cylinder assembly coupled to the bucket and the outside gate.

37. The bucket assembly of claim 35, wherein the outside gate includes a first mounting bracket positioned to lie in a space between the first and second hoppers upon movement of the first and second external flaps to their closed position, at least one of the hoppers includes a second mounting bracket, and the moving means includes an extensible hydraulic cylinder assembly having one end pivotally coupled to the first mounting bracket and another end pivotally coupled to the second mounting bracket.

38. A bucket assembly or dispensing product onto an underlying carrier, the bucket assembly comprising
- a bucket including a first hopper, a second hopper, and means for connecting the first and second hoppers to one another so that the hoppers are arranged in side-by-side relation, each hopper including a bottom end formed to include a dispensing outlet therein,
- first means for selectively opening and closing the dispensing outlets of each of the first and second hoppers simultaneously to regulate discharge of product in each of the hoppers from the hoppers through the dispensing outlets onto underlying carriers, and
- second means for selectively closing the dispensing outlets of each of the first and second hoppers simultaneously without using the first means to close the dispensing outlets so that a product-receiving receptacle is established in each of the first and second hoppers above the dispensing outlets,
- wherein the second means includes an inside gate extending into each of the first and second hoppers.

39. A bucket assembly for dispensing product onto an underlying carrier, the bucket assembly comprising
- a bucket including a first hopper, as second hopper, and means for connecting the first and second hoppers to one another so that the hoppers are arranged in side-by-side relation, each hopper including a bottom end formed to include a dispensing outlet therein,
- first means for selectively opening and closing the dispensing outlets of each of the first and second hoppers simultaneously to regulate discharge of product in each of the hoppers from the hoppers through the dispensing outlets onto underlying carriers, and
- second means for selectively closing the dispensing outlets of each of the first and second hoppers simultaneously without using the first means to close the dispensing outlets so that a product-receiving receptacle is established in each of the first and second hoppers above the dispensing outlets,
- wherein the second means includes an inside gate including first and second internal closure flaps and means for connecting the inside gate to the bucket so that each of the internal closure flaps is movable between a closed position engaging an inside wall of the hopper at a point above the dispensing outlet to close the dispensing outlet and an opened position disengaging the inside wall of the hopper to open the dispensing outlet as long as the first means is retained in its position opening the dispensing outlet.

40. The bucket assembly of claim 39, wherein he second means further includes means for moving the inside gate relative to the bucket to move the first and second internal closure flaps in unison between their closed and opened positions.

41. The bucket assembly of claim 40, wherein the moving means includes a hydraulic cylinder assembly coupled to the bucket and the inside gate.

* * * * *